United States Patent [19]

Evans et al.

[11] Patent Number: 4,650,852

[45] Date of Patent: Mar. 17, 1987

[54] METHOD FOR CONTROLLING POLYMERIZATION RATE OF CYCLIC POLYCARBONATE OLIGOMERS WITH PRETREATED CATALYST

[75] Inventors: Thomas L. Evans, Clifton Park; David A. Williams, Scotia, both of N.Y.

[73] Assignee: General Electric Company, Schenectady, N.Y.

[21] Appl. No.: 756,213

[22] Filed: Jul. 18, 1985

[51] Int. Cl.$^4$ ............................................. C08G 63/62
[52] U.S. Cl. ................................. 528/371; 528/196; 528/198; 528/199; 528/200; 528/370
[58] Field of Search ............... 528/371, 370, 196, 198, 528/199, 200

[56] References Cited

U.S. PATENT DOCUMENTS 3,386,954  6/1968  Schnell et al. ...................... 528/371

Primary Examiner—Harold D. Anderson
Attorney, Agent, or Firm—William H. Pittman; James C. Davis, Jr.; James Magee, Jr.

[57] ABSTRACT

Cyclic polycarbonate oligomers are polymerized to linear polycarbonates by contact with a polycarbonate formation catalyst which has been modified by contacting the same with at least one diaryl carbonate, preferably diphenyl carbonate. Said modification decreases the polymerization rate or introduces an induction period into the polymerization reaction.

10 Claims, 9 Drawing Figures

(I) $-Y^1-R^1-Y^1-\overset{\overset{O}{\|}}{C}-$
(II) $-A^1-Y^2-A^2-$
(III) $R^1(Y^1COX)_2$
(IV) $R^1(Y^3H)_2$
(V) $X-\overset{\overset{O}{\|}}{C}-Y^1(R^1-Y^1-\overset{\overset{O}{\|}}{C}-Y^1)_n\overset{\overset{O}{\|}}{C}-X$
(VI) $M^{\oplus}BZ_4^{\ominus}$
(VII) $(R^2)_4 Q^{\oplus}$
(VIII) 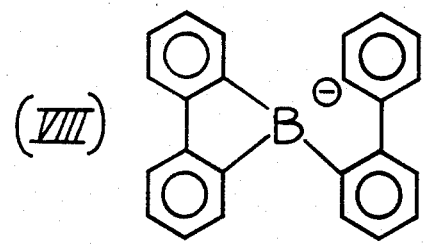
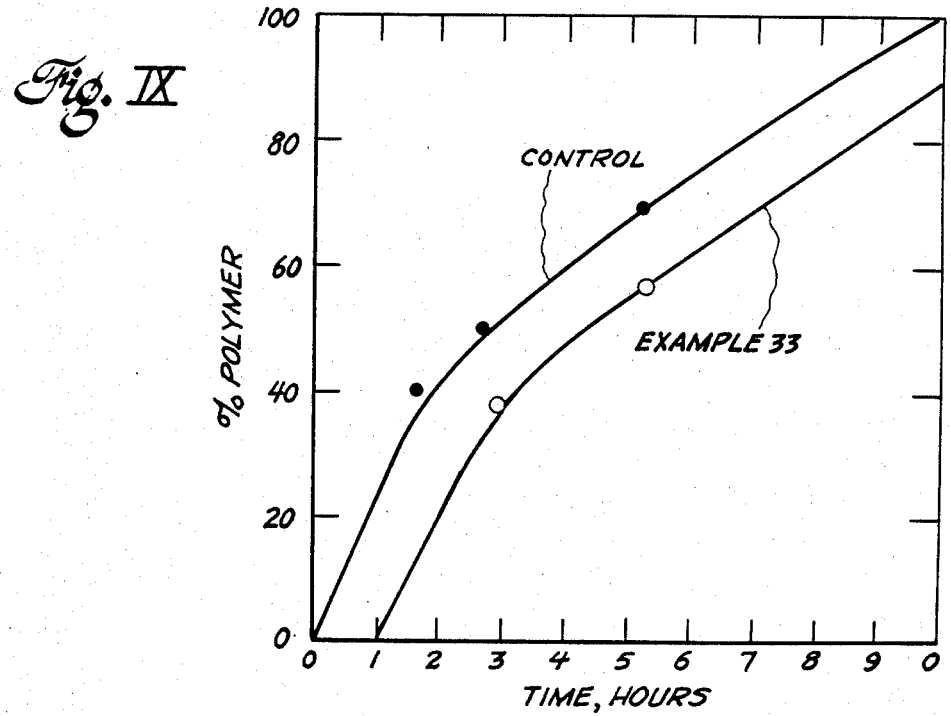
Fig. IX

METHOD FOR CONTROLLING POLYMERIZATION RATE OF CYCLIC POLYCARBONATE OLIGOMERS WITH PRETREATED CATALYST

This invention relates to the formation of linear polycarbonates from cyclic polycarbonate oligomers, and more particularly to a method for modifying the rate of the polymerization reaction leading to such formation.

The conversion of low molecular weight cyclic aromatic carbonate polymers to linear polycarbonates is known. Reference is made, for example, to the following U.S. Pat. Nos.:

3,155,683; 3,386,954;
3,274,214; 3,422,119.

More recently, cyclic polycarbonate oligomer mixtures and similar mixtures involving thiol analogs of the carbonates have been prepared and converted to linear polycarbonates, often of very high molecular weight, by contact with various polycarbonate formation catalysts. Reference is made to copending, commonly owned applications Ser. No. 704,122, filed Feb. 22, 1985, and Ser. No. 723,672, filed Apr. 16, 1985, now U.S. Pat. No. 4,605,731, the disclosures of which are incorporated by reference herein. The polycarbonate formation catalysts disclosed as useful in said applications include various bases and Lewis acids.

The conversion of cyclic polycarbonate oligomer mixtures to linear polycarbonates has high potential for utilization in reactive processing methods, such as polymerization in a mold for direct production of molded articles. One reason for this is the low melt viscosity of the oligomer mixtures, as a result of which handling thereof is simple and convenient.

In some polymerization processes, it is desirable to lower the rate of polymerization or to introduce an induction period for ease of handling. This is a desirable option for the polymerization of cyclic polycarbonate oligomer mixtures, a reaction which may take place in five minutes or less under normal conditions. If the polymerization rate could be decreased when desired, such operations as the molding of large parts could be facilitated.

A principal object of the present invention, therefore, is to provide a method for controlling the polymerization rate of cyclic polycarbonate oligomers to linear polycarbonates.

A further object is to provide a means to lower the polymerization rate or introduce an induction period.

A further object is to provide a method for modifying the polycarbonate formation reaction so as to facilitate its use under a wide variety of molding conditions.

A still further object is to modify polycarbonate formation catalysts so as to accomplish the foregoing.

Other objects will in part be obvious and will in part appear hereinafter.

In one of its aspects, the present invention is a method for modifying a polycarbonate formation catalyst to control the polymerization rate to a linear polymer by contact therewith of at least one cyclic oligomer comprising structural units having formula I in the drawings, wherein each $R^1$ is independently a divalent aliphatic, alicyclic or aromatic radical and each $Y^1$ is independently oxygen or sulfur, which comprises initially contacting said catalyst with at least one diaryl carbonate at a temperature up to about 350° C.

As will be apparent from the above, the cyclic oligomers useful in this invention may contain organic carbonate, thiolcarbonate and/or dithiolcarbonate units. The various $R^1$ values therein may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 60% and more preferably at least about 80% of the total number of $R^1$ values in the cyclic oligomers, and most desirably all of said $R^1$ values, are aromatic. The aromatic $R^1$ radicals preferably have formula II, wherein each of $A^1$ and $A^2$ is a single-ring divalent aromatic radical and $Y^2$ is a bridging radical in which one or two atoms separate $A^1$ from $A^2$. The free valence bonds in formula II are usually in the meta or para positions of $A^1$ and $A^2$ in relation to $Y^2$. Such $R^1$ values may be considered as being derived from bisphenols of the formula $HO-A^1-Y^2-A^2-OH$. Frequent reference to bisphenols will be made hereinafter, but it should be understood that $R^1$ values derived from suitable compounds other than bisphenols may be employed as appropriate.

In formula II, the $A^1$ and $A^2$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^2$, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula II is the 2,2-bis(4-phenylene)propane radical, which is derived from bisphenol A and in which $Y^2$ is isopropylidene and $A^1$ and $A^2$ are each p-phenylene.

As noted, each $Y^1$ value is independently oxygen or sulfur. Most often, all $Y^1$ values are oxygen and the corresponding compositions are cyclic polycarbonate oligomers.

The cyclic oligomers have degrees of polymerization from 2 to about 30. Cyclic oligomer mixtures are preferred, especially those in which the various molecular species have degrees of polymerization up to about 20, with a major proportion being up to about 12 and a still larger proportion up to about 15. Such mixtures have relatively low melting points as compared to single compounds such as the corresponding cyclic trimer. The cyclic oligomer mixtures are generally liquid at temperatures above 300° C., most often at temperatures above 225° C. and frequently above 200° C.

The cyclic oligomer mixtures should generally contain low proportions of linear oligomers. In general, no more than about 10% by weight, and most often no more than about 5%, of such linear oligomers should be present. The mixtures also usually contain low percentages (frequently less than 30% and preferably no higher than about 20%) of polymers (linear or cyclic) having a degree of polymerization greater than about 30. These properties, coupled with the relatively low melting points and viscosities of the cyclic oligomer mixtures, contribute to their utility as resin precursors, especially for high molecular weight resins.

Suitable cyclic oligomer mixtures may be prepared by a condensation reaction involving at least one compound selected from the group consisting of bishaloformates and thiol analogs thereof, said compounds having formula III, or a mixture thereof with at least one bis(active hydrogen) compound having formula IV, wherein $R^1$ and $Y^1$ are as defined hereinabove, X is chlorine or bromine, and each $Y^3$ is independently sulfur when the corresponding $R^1$ is aliphatic or alicyclic and oxygen or sulfur when the corresponding $R^1$ is aromatic. (The compound of formula III or mixture thereof with that of formula IV is frequently referred to hereinafter as "bishaloformate composition" or "bischloroformate composition".) The condensation reaction typically takes place interfacially when a solution of said compound in a substantially non-polar organic liquid is contacted with a tertiary amine from a specific class and an aqueous alkali metal hydroxide solution.

In addition to compounds of formula III and, optionally, formula IV, the bishaloformate composition may also contain other compounds, including oligomers of formula V, wherein $R^1$, $Y^1$ and X are as previously defined and n is a small number, typically about 1-4.

While the X values in formula III may be chlorine or bromine, the bischloroformates, in which X is chlorine, are most readily available and their use is therefore preferred. (Frequent reference to bischloroformates will be made hereinafter, but it should be understood that other bishaloformates may be substituted therefor as appropriate.) Suitable bis(active hydrogen) compounds of formula IV include diols and thiol analogs thereof having divalent radicals of formula II which are different from the corresponding divalent radicals in the compound of formula III, as well as other dihydroxyaromatic compounds and thiol analogs thereof. When such bis(active hydrogen) compounds are present, they generally comprise up to about 50%, most often up to about 20% and preferably up to about 10%, of the bischloroformate mixture. Most preferably, however, said mixture consists essentially of bischloroformates. Any cyclic oligomers containing divalent aliphatic radicals (or their vinylogs) flanked by two oxygen atoms are prepared by using a mixture of compounds of formulas III and IV.

The tertiary amines useful in the oligomer formation reaction ("tertiary" in this context denoting the absence of N—H bonds) generally comprise those which are oleophilic; i.e., which are soluble in and highly active in organic media, especially those used in the oligomer preparation method, and in particular those which are useful for the formation of polycarbonates. Reference is made, for example, to the tertiary amines disclosed in the aforementioned U.S. Pat. No. 4,217,438 and in U.S. Pat. No. 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate composition is essential for the formation of the cyclic oligomer mixture. For the most part, such amines contain at least about 6 and preferably about 6-14 carbon atoms.

The most useful amines are trialkylamines containing no branching on the carbon atoms in the 1- and 2- positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Also employed in the oligomer formation reaction is an aqueous alkali metal hydroxide solution. It is most often lithium, sodium or potassium hydroxide, with sodium hydroxide being preferred because of its availability and relatively low cost. The concentration of said solution is about 0.2–10M and preferably no higher than about 3M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, in the first step the reagents and components are placed in contact under conditions wherein the bischloroformate composition is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate composition or a mixture thereof with the amine is added gradually to a mixture of the other materials. It is within the scope of this embodiment to incorporate the amine in the mixture to which the bischloroformate is added, or to add it gradually, either in admixture therewith or separately. Continuous or incremental addition of amine is frequently preferred, whereupon the cyclic oligomer mixture is obtained in relatively pure form and in high yield.

Although addition of bischloroformate composition neat (i.e., without solvents) is within the scope of this embodiment, it is frequently inconvenient because many bischloroformates are solids. Therefore, it is preferably added as a solution in a portion of the organic liquid, especially when it consists essentially of bischloroformate. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to polymer and insoluble and/or intractable by-products, it is preferred to use not more than about 0.7 mole of bischloroformate composition (calculated as bisphenol bischloroformate) per liter of organic liquid present in the reaction system, including any liquid used to dissolve said composition. Preferably, about 0.003–0.6 mole thereof is used when it consists entirely of bischloroformate, and no more than about 0.5 mole is used when it is a mixture of compounds of formulas III and IV. It should be noted that this is not a molar concentration in the organic liquid when the bischloroformate composition is added gradually, since said composition is consumed as it is added to the reaction system.

The molar proportions of the reagents constitute another important feature for yield and purity maximization. The preferred molar ratio of amine to bischloroformate composition (calculated as bisphenol bischloroformate) is about 0.1–1.0:1 and most often about 0.2–0.6:1. The preferred molar ratio of alkali metal hydroxide to said composition is about 1.5–3:1 and most often about 2–3:1.

The second step of the cyclic oligomer preparation method is the separation of the oligomer mixture from at least a portion of the polymer and insoluble material present. When other reagents are added to the alkali metal hydroxide solution and the preferred conditions and material proportions are otherwise employed, the cyclic oligomer mixture (obtained as a solution in the organic liquid) typically contains less than 30% by weight and frequently less than about 20% of polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using at least one aliphatic or heterocyclic tertiary amine which, under the reaction conditions, dissolves preferentially in the organic phase of the reaction system, and gradually adding all the reagents simultaneously to a substantially non-polar organic liquid or a mixture of said liquid with water, said liquid or mixture being maintained at a temperature in the range of about 0°–50° C.; the amount of bischloroformate composition used being up to about 0.7 mole for each liter of said organic liquid present in the reaction system, and the molar proportions of amine and alkali metal hydroxide to bischloroformate composition being approximately 0.2–1.0:1 and 2–3:1, respectively; and recovering the cyclic oligomers thus formed.

As in the embodiment previously described, another portion of said liquid may serve as a solvent for the bischloroformate composition. Addition of each reagent is preferably continuous, but may be incremental for any or all of said reagents.

Among the principal advantages of this preferred embodiment are the non-criticality of the degree of dilution of the reagents and the ability to complete the addition and reaction in a relatively short time, regardless of reaction scale. It ordinarily takes only about 25–30 minutes to complete cyclic oligomer preparation by this method, and the cyclic oligomer yield may be 85–90% or more. The crude product usually also contains only minor amounts of high molecular weight linear polycarbonates as by-products. By contrast, use of a less preferred embodiment may, depending on reaction scale, require an addition period as long as 8–10 hours and the crude product may contain substantial proportions of linear by-products with molecular weights of about 4,000–10,000, which, if not removed, may interfere with subsequent polymerization of the cyclic oligomers by acting as chain transfer agents.

It is believed that the advantageous results obtained by employing the preferred embodiment are a result of the relatively low pH of the reaction mixture, typically about 9–10. When bischloroformate composition (and optionally amine) is added to alkali metal hydroxide, on the other hand, the initial pH is on the order of 14.

When the polymer separation step is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The preparation of cyclic oligomer mixtures useful in this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLES 1–18

Bisphenol A bischloroformate was reacted with aqueous sodium hydroxide and triethylamine in an organic liquid (chloroform in Example 7, methylene chloride in all other examples) according to the following procedure: The bischloroformate was dissolved in half the amount of organic liquid employed and was added gradually, with slow stirring, to the balance of the reaction mixture. In Examples 1–10 and 12, the triethylamine was all originally present in the reaction vessel; in Examples 14–16, it was added gradually at the same time as the bischloroformates; and in Examples 11, 13, 17 and 18, it was added incrementally at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymers were precipitated by addition of acetone.

The reaction conditions for Examples 1–18 are listed in Table 1 together with the approximate percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

TABLE I

| Example | Bischloroformate amt., mmole/l. org. liquid | Bischloroformate amt., total mmol. | NaOH molarity | Molar ratio, amine: bis-chloroformate | Temperature | Addition time, min. | % oligomer in product |
|---|---|---|---|---|---|---|---|
| 1 | 100 | 2 | 0.313 | 0.5 | 20 | 30 | 97 |
| 2 | 100 | 2 | 0.625 | 0.5 | 20 | 30 | 95 |
| 3 | 100 | 2 | 2.5 | 0.5 | 35 | 55 | 93 |
| 4 | 100 | 2 | 2.5 | 0.5 | 0 | 30 | 77 |
| 5 | 100 | 2 | 2.5 | 0.5 | 20 | 30 | 87 |
| 6 | 100 | 2 | 2.5 | 0.5 | 35 | 30 | 78 |
| 7 | 100 | 2 | 2.5 | 0.5 | 50 | 30 | 88 |
| 8 | 100 | 2 | 2.5 | 0.25 | 20 | 30 | 74 |
| 9 | 100 | 1 | 2.5 | 0.2 | 20 | 15 | 75 |
| 10 | 200 | 4 | 2.5 | 0.5 | 20 | 30 | 88 |
| 11 | 500 | 10 | 2.5 | 0.25 | 25 | 105 | 83 |
| 12 | 500 | 10 | 2.5 | 0.25 | 25 | 105 | 78 |
| 13 | 500 | 10 | 2.5 | 0.25 | 25 | 105 | 83 |
| 14 | 500 | 10 | 2.5 | 0.25 | 25 | 105 | 87 |
| 15 | 500 | 10 | 2.5 | 0.29 | 30 | 90 | 78 |
| 16 | 500 | 10 | 2.5 | 0.25 | 30 | 20 | 75 |
| 17 | 500 | 10 | 2.5 | 0.25 | 40–45 | 105 | 79 |
| 18 | 500 | 10 | 2.5 | 0.4 | 25 | 105 | 79 |

EXAMPLE 19

Bisphenol A bischloroformate (2.0 mmol.) was reacted with aqueous sodium hydroxide and 4-dimethylaminopyridine in methylene chloride. The procedure employed was that of Example 1, except that 66.67 mmol. of bisphenol A per liter of methylene chloride was employed, the aqueous sodium hydroxide concentration was 5.0M and the reaction temperature was about 25° C. The product comprised 85% cyclic oligomer.

EXAMPLE 20

A solution of 1.4 mmol. of bisphenol A bischloroformate and 0.6 mmol. of 1,4-benzenedimethanol bischloroformate in 10 ml. of a tetrahydrofuran-methylene chloride solution comprising 10% by volume tetrahydrofuran was added over 30 minutes at 30° C, with stirring, to a mixture of 10 ml. of methylene chloride, 2 ml. of 2.5M aqueous sodium hydroxide and 1 mmol. of triethylamine. After addition was complete, the mixture was washed three times with dilute aqueous hydrochloric acid and the organic layer was separated, dried by filtration through phase separation paper and evaporated under vacuum. The product was the desired mixed cyclic polycarbonate oligomer of bisphenol A and benzene-1,4-dimethanol.

EXAMPLES 21–32

Following the procedure of Example 20, products containing at least about 80% mixed cyclic polycarbonate oligomers were prepared from mixtures of bisphenol A bischloroformate and the dihydroxy compounds or dithiols listed in Table II. In each case, a total of 2 mmol. of reagent A was used. The proportion of the listed dihydroxy compound or dithiol was 10 mole percent unless otherwise indicated.

TABLE II

| Example | Dihydroxy compound or dithiol |
|---|---|
| 21 | 1,1-Bis(4-hydroxyphenyl)cyclohexane |
| 22 | 1,1-Bis(4-hydroxyphenyl)cyclododecane |
| 23 | 2,2-Bis(3-5-dimethyl-4-hydroxyphenyl)propane |
| 24 | 2,2-Bis(3,5-dibromo-4-hydroxyphenyl)propane |
| 25 | Bis(4-hydroxyphenyl) sulfone |
| 26 | 4,4'-Thiodiphenol |
| 27 | Bis(3,5-dimethyl-4-hydroxyphenyl) sulfone |
| 28 | 2,2-Bis(4-hydroxyphenyl)-1,1-dichloroethylene |
| 29 | Hydroquinone |
| 30 | Hydroquinone (15 mole percent) |
| 31 | 4,4'-Biphenyldithiol |
| 32 | 1,12-Dodecanedithiol |

The polymerization of the above-described cyclic polycarbonate oligomers involves the use of a polycarbonate formation catalyst. Such catalysts include various bases and Lewis acids. It is known that basic catalysts may be used to prepare polycarbonates by the interfacial method, as well as by transesterification and from cyclic oligomers. Such catalysts may also be used to polymerize the cyclic oligomer mixtures. Examples thereof are lithium 2,2,2-trifluoroethoxide, n-butyllithium and tetramethylammonium hydroxide. Also useful are various weakly basic salts such as sodium benzoate and lithium stearate.

Lewis acids useful as polycarbonate formation catalysts include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

Also useful as polycarbonate formation catalysts are coordination compounds represented by formula VI, wherein M is one equivalent of a cation other than hydrogen and Z is an aromatic radical or two Z values taken together form a divalent aromatic radical.

The M value may be any metal cation, with alkali metals, especially lithium, sodium and potassium, being preferred. More desirably however, it has formula VII, wherein each $R^2$ is independently a $C_{1-4}$ primary alkyl or $C_{6-10}$ aryl radical, preferably alkyl and most desirably methyl, and Q is nitrogen, phosphorus or arsenic.

The Z values in formula VI may be phenyl radicals or substituted phenyl radicals wherein the substituents may be $C_{1-4}$ alkyl, aryl, halo, nitro, $C_{1-4}$ alkoxy or the like. Any substituents are preferably electron-withdrawing groups such as halo or nitro, but unsubstituted phenyl radicals are most preferred. It is also possible for two Z values together to form a divalent radical such as 2,2'-biphenylene.

Thus, it will be apparent to those skilled in the art that suitable catalytic species include such compounds as lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. As between these and similar catalysts, the choice may be dictated by such factors as the desired rate of reaction and the chemical nature of the oligomer composition being polymerized. For the preparation of aromatic polycarbonates such as bisphenol A polycarbonate, preferred catalysts are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

According to the present invention, the polycarbonate formation catalyst is contacted with at least one diaryl carbonate at a temperature up to about 350° C., prior to its use to polymerize the cyclic oligomers. The diaryl carbonates which may be used include diphenyl carbonate and substituted derivatives thereof, wherein the substituents may be, for example, halo (e.g., fluoro and chloro), trifluoroalkyl, alkoxy (especially $C_{1-4}$ alkoxy), nitro and combinations thereof. The nature of the substituents on any substituted diaryl carbonate has an effect on the polymerization rate. Thus, electron-donating substituents such as methoxy increase the polymerization rate, while electron-withdrawing substituents such as nitro and halo decrease the rate thereof. For the most part, a decrease in polymerization rate is desired; therefore, the preferred diaryl carbonates are diphenyl carbonate and the halo-, trifluoroalkyl- and nitro-substituted derivatives. Diphenyl carbonate is particularly preferred.

The molar ratio of diaryl carbonate to catalyst is not critical but is generally at least about 1:1 and preferably at least about 2:1. There is no effective upper limit of said molar ratio for the purpose of catalyst modification. Since the diaryl carbonate may also serve as a chain transfer or endcapping agent, thus controlling the molecular weight of the linear polycarbonate, the maximum amount thereof may be adjusted to serve this purpose. For the most part, up to about 2.5 mole percent of diaryl carbonate may be used, based on structural units in the oligomer.

The temperature at which catalyst modification is effected is up to about 350° C. and is generally in the range of about 150°-300° C. If desired, there may be employed a substantially inert diluent such as chlorobenzene, o-dichlorobenzene or dichlorotoluene. However, it is also within the scope of the invention to modify the catalyst in the absence of diluent; this is frequently preferred, particularly when oligomer polymerization is effected in a mold.

Following modification of the catalyst, the polymerization of the cyclic carbonate is conducted, typically at temperatures up to about 350° C., preferably in the range of about 200°-300° C. The preferred catalyst proportion is about 0.001-0.5 mole percent, based on structural units in the oligomer. This polymerization method is also an aspect of the invention.

Since a "living" polymerization is involved, the molecular weight of the polymer will vary inversely with the proportion of catalyst used. On the other hand, the reaction rate varies directly with the proportion of catalyst. Therefore, as said proportion is increased, the time required for complete polymerization of cyclics and the molecular weight of the product both decrease.

Although a solvent may be used during polymerization, it is not necessary and is frequently not preferred. It is within the scope of the invention to conduct the polymerization in a mold to produce a molded article.

For the most part, polycarbonate formation catalysts initially contacted with diaryl carbonate remain effective, but the polymerization proceeds at a substantially slower rate. This was found to be the case with all of the catalysts listed hereinabove except the titanium-containing catalysts, illustrated by triethanolaminetitanium isopropoxide and bisisopropoxytitanium acetylacetonate. For those catalysts, a distinct induction period was noted. This is illustrated in a particularly dramatic manner in Example 33.

The method of this invention is illustrated by the following examples.

EXAMPLE 33

A mixture of 0.6 mg. (0.0028 mmol.) of diphenyl carbonate, 10 microliters of a 0.1M solution in toluene of triethanolaminetitanium isopropoxide (0.001 mmol.) and 2 ml. of dry 2,4-dichlorotoluene was heated under reflux for one hour, after which 1 gram (3.94 mmol.) of a cyclic bisphenol A polycarbonate oligomer mixture similar to those of Examples 1-18 was added, along with an additional 8 ml. of 2,4-dichlorotoluene. Samples were removed from the mixture periodically and the molecular weights thereof determined by gel permeation chromatography. Comparison was made with a control in which the cyclic carbonate oligomer mixture and diphenyl carbonate were initially combined with 10 ml. of dichlorotoluene and allowed to reflux for 1 hour, after which the catalyst solution was added.

The results are shown graphically in FIGURE IX. As is apparent, a significant induction period was introduced by modification of the catalyst according to the invention.

EXAMPLES 34-36

Three mixtures of 4.2 mg. (0.02 mmol.) of diphenyl carbonate and 5 microliters of a 0.1M solution in toluene of triethanolaminetitanium isopropoxide (0.0005 mmol) were heated at 200° C. for one hour. There was then added to each mixture 500 mg. (1.97 mmol.) of a cyclic bisphenol A polycarbonate oligomer mixture similar to those of Examples 1-18. The mixtures were heated at 250° C. for various periods, after which they were cooled and dissolved in methylene chloride and the products were precipitated into methanol. Comparison was made with a control in which all three reagents were initially heated together.

The following results were obtained.

| Example | Heating time, min. | Results |
|---|---|---|
| Control | 5 | High MW polymer |
| 34 | 5 | No polymer |
| 35 | 30 | Slight MW build |
| 36 | 60 | Polymer Mw = 31,000 |

The induction period introduced according to this invention is apparent.

EXAMPLE 37

A mixture of 4.2 mg. (0.02 mmol.) of diphenyl carbonate, 1.9 mg. (0.005 mmol.) of tetramethylammonium tetraphenylborate and 2 ml. of dry 2,4-dichlorotoluene was heated under reflux for 1 hour, after which 500 mg. (1.97 mmol.) of a cyclic bisphenol A polycarbonate oligomer mixture similar to those of Examples 1-18 was added, along with an additional 2 ml. of 2,4-dichlorotoluene. Heating under reflux was continued for ½ hour, after which the mixture was analyzed by gel permeation chromatography which showed that 75% conversion to polymer had occurred.

Comparison was made with a control in which the diphenyl carbonate, cyclic oligomer mixture and dichlorotoluene (4 ml.) were first heated for one hour and then tetramethylammonium tetraphenylborate was added and heating was continued for ½ hour. The control showed 94% conversion to polymer.

EXAMPLE 38

The amounts of reagents employed were the same as in Example 37. The tetramethylammonium tetraphenylborate and diphenyl carbonate were heated in the melt (in the absence of solvent) at 200° C. for one hour, after which the cyclic bisphenol A polycarbonate oligomer mixture was added and the mixture was heated at 250° C. for five minutes. Only 8% conversion to polymer took place. Comparison was made with a control in which the oligomer mixture and diphenyl carbonate were first heated at 200° C. for one hour and then the tetramethylammonium tetraphenylborate was added and heating was continued at 250° C. for five minutes; 30% conversion to polymer occurred.

EXAMPLE 39

The procedure of Example 38 was repeated, substituting 500 mg. (0.04 mmol.) of lithium trifluoroethoxide for the tetramethylammonium tetraphenylborate. No polymerization was noted during the reaction period, while 16% polymerization was noted in the control.

What is claimed is:

1. A method for preparing a linear polycarbonate resin which comprises:
modifying a polycarbonate formation catalyst by contacting it with at least one diaryl carbonate at a temperature in the range of about 150°-300° C., and subsequently contacting a cyclic polycarbonate oligomer composition in which the oligomers comprise structural units having the formula

wherein each $R^1$ is independently a divalent aliphatic, alicyclic or aromatic radical and each $Y^1$ is independently oxygen or sulfur, with said modified catalyst at a temperature up to about 350° C.

2. A method according to claim 1 wherein the oligomer composition is a mixture of cyclic oligomers having degrees of polymerization from 2 to about 20, each $Y^1$ is oxygen and the polycarbonate formation catalyst is at least one base or Lewis acid.

3. A method according to claim 2 wherein each R has the formula

wherein each of $A^1$ and $A^2$ is a single-ring divalent aromatic radical, $Y^2$ is a bridging radical in which one or two atoms separate $A^1$ from $A^2$, and the polymerization temperature is in the range of about 200°-300° C.

4. A method according to claim 3 wherein each of $A^1$ and $A^2$ is p-phenylene, $Y^2$ is isopropylidene and the diaryl carbonate is diphenyl carbonate or a halo- trifluoroalkyl-, alkoxy- or nitro-substituted derivative thereof.

5. A method according to claim 4 wherein the polycarbonate formation catalyst is at least one compound selected from the group consisting of lithium 2,2,2-trifluoroethoxide, n-butyllithium, tetramethylammonium hydroxide, sodium benzoate, lithium stearate, dioctyltin oxide, triethanolaminetitanium isopropoxide, tetra(2-ethylhexyl) titanate, bisisopropoxytitanium bisacetylacetonate, the bisisopropoxyaluminum salt of ethyl acetoacetate, and compounds having the formula

wherein M is one equivalent of a cation other than hydrogen and Z is an aromatic radical or two Z values taken together form a divalent aromatic radical.

6. A method according to claim 5 wherein the diaryl carbonate is diphenyl carbonate which is present in an amount from about 2 moles per mole of polycarbonate formation catalyst to about 2.5 mole percent based on oligomer structural units, and wherein a major proportion of the oligomers have degrees of polymerization up to about 12.

7. A method according to claim 6 wherein the polycarbonate formation catalyst is a titanium-containing catalyst.

8. A method according to claim 7 wherein the polycarbonate formation catalyst is triethanolaminetitanium isopropoxide.

9. A method according to claim 7 wherein the polycarbonate formation catalyst is bisisopropoxytitanium acetylacetonate.

10. A method according to claim 6 wherein the polycarbonate formation catalyst has formula VI, Z is phenyl and M is lithium, sodium or potassium or has the formula

wherein each $R^2$ is a $C_{1-4}$ primary alkyl or $C_{6-10}$ aryl radical and Q is nitrogen, phosphorus or arsenic.

* * * * *